US008994552B2

(12) United States Patent
Jiang et al.

(10) Patent No.: US 8,994,552 B2
(45) Date of Patent: Mar. 31, 2015

(54) MEMS UTILITY METERS WITH EXCHANGEABLE METROLOGY UNIT

(71) Applicants: Changming Jiang, Chengdu (CN); Yong Feng, Chengdu (CN); Sugang Jiang, Chengdu (CN); Chih-Chang Chen, Cupertino, CA (US); Liji Huang, San Jose, CA (US)

(72) Inventors: Changming Jiang, Chengdu (CN); Yong Feng, Chengdu (CN); Sugang Jiang, Chengdu (CN); Chih-Chang Chen, Cupertino, CA (US); Liji Huang, San Jose, CA (US)

(73) Assignee: M-tech Instrument Corporation (Holding) Limited, Hong Kong (HK)

( * ) Notice: Subject to any disclaimer, the term of this patent is extended or adjusted under 35 U.S.C. 154(b) by 206 days.

(21) Appl. No.: 13/662,520

(22) Filed: Oct. 28, 2012

(65) Prior Publication Data

US 2014/0118161 A1 May 1, 2014

(51) Int. Cl.
 *G01F 5/00* (2006.01)
 *G08C 15/06* (2006.01)
 *H04Q 9/00* (2006.01)

(52) U.S. Cl.
 CPC ............. *H04Q 9/00* (2013.01); *H04Q 2209/43* (2013.01); *H04Q 2209/60* (2013.01)
 USPC .................................. 340/870.02; 73/204.22

(58) Field of Classification Search
 USPC .................. 340/870.02; 73/195, 197, 861.63, 73/204.22
 See application file for complete search history.

(56) References Cited

U.S. PATENT DOCUMENTS

| 6,474,132 B1 * | 11/2002 | Hathaway et al. ............. 73/1.27 |
| 2005/0183500 A1 * | 8/2005 | Kanouda et al. ............. 73/202.5 |
| 2007/0017285 A1 * | 1/2007 | Wang et al. ................ 73/204.26 |

* cited by examiner

*Primary Examiner* — Omar S Khan

(57) ABSTRACT

An all-electronic utility gas meter using with micromachined (a.k.a. MEMS Micro Electro Mechanical Systems) silicon sensor to measure gas metrology data for custody transfer or tariff in city gas metering application is disclosed in the present invention. The meter has two separate metrology units. One of the units is located in the main flow channel with the insertion probing configuration while the other is configured as a bypass unit assembly with the main metrology unit. The bypass metrology unit can perform independent metrology tasks and can be exchanged onsite during service, maintenance or repair without dismantle the meter from the service pipeline. The bypass metrology unit also can be used to compare the measured data from time to time and performance self-diagnosis that shall help the performance and data authentication during the meter field service. Both of the units can be powered by battery or external sources. The units can be connected to network as well as provide internal plural storages for data transmission and safety.

16 Claims, 3 Drawing Sheets

MEMS UTILITY METERS WITH EXCHANGEABLE METROLOGY UNIT

Figure 1:
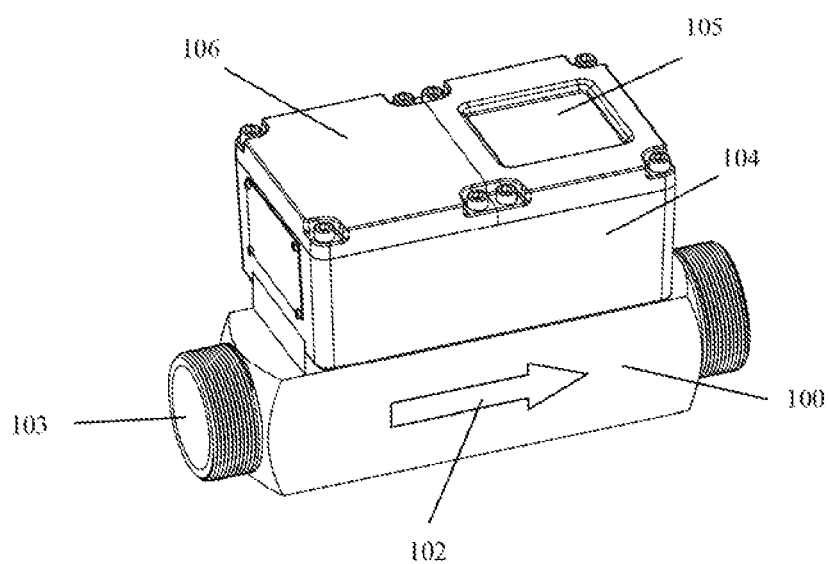

We claim the priority to U.S. provisional application Ser. No. 61/554,935, filed on Nov. 2, 2011.

BACKGROUND OF THE INVENTION

1. Field of the Invention

This invention relates to apparatus with micromachined silicon sensors or Micro Electro Mechanical Systems (MEMS) mass flow sensing technology that measures the city gas in the utility industry that requires custody transfer or tariff. This invention also provides the design and make of an independent metrology unit in apparatus that serves for the utility industry such that maintenance service can be performed on-site without separation of the apparatus from the service line.

2. Description of the Related Art

Gas meters for city gas metrology or custody transfer have been dominated by mechanical technology such as turbine, rotary and diaphragm meters. These meters have been on market for over 160 years enjoying a long service life and reliability. However, these mechanical technologies measure only volumetric changes of the gas and additional apparatus for temperature and pressure measurement are required in order to compensate the significant metrology impact due to the environmental variations of temperature and pressure. For example, for a volumetric mechanical gas meter, every 10 Celsius degree variation of the environmental temperature will lead to 3% deviation of the measured volumetric value for city gas which is either unfair to the end users or a loss for the gas suppliers based on the single volumetric unit price. Alternative practice adopted by some of the current gas suppliers using a nominal "thermo" value that in fact is arbitrary to the users. Since earlier 1980s, many efforts have been made for an all-electronic gas meter that shall have the capability of compensate the variation of temperature and pressure as well as the capability for remote data communication and data safety. The earlier development of the all-electronic ultrasonic gas meters in 1980s, for example, by Taphorn et al. (W. Taphorn et al., Ultrasonic gas meter. U.S. Pat. No. 5,433,117) had been successfully leading to the electronic gas meters in deployment. But the cost of such has up to date prevented it from large scale installation in the field. Pearman et al. (A. N. J. Pearman et al, Electronic gas meter, U.S. Pat. No. 4,918,995) teaches an electronic gas meter using a MEMS mass flow sensor that shall have the automatic temperature and pressure compensation. But the pattern does not lead to a commercialization. Matter (D. Matter et al., Increased accuracy gas energy meter, U.S. Pat. No. 7,222,028) proposed a new electronic gas meter with a MEMS mass flow sensor integrated with application specific integrated circuitry. Such a meter can not only measure the flow rate but the gas energy. The prototype based on this pattern had been fabricated but commercialization is not achieved as of today because of no acceptable metrology standards are available. In addition, the design of as by-pass flow sensing channel in the order of a couple of mini-meters in diameter also led to speculations of possible losing of metrology due to contamination or particles in the flow medium. Muraoka et al. (Muraoka et al, Flowmeter, U.S. Pat. No. 7,861,585) disclosed an electronic gas meter with dual MEMS sensors for large flow measurement, and the meters fabricated have been used in some industrial applications, but due to the design has as high pressure drop, applications in city gas metrology could not be realized.

Wang et al. (Wang et al., Micromachined mass flow sensor and insertion type flow meters and manufacture methods, U.S. Pat. No. 7,536,908) teaches an apparatus fur gas flow measurement utilizing a MEMS mass flow sensor. It is an all-electronic gas meter with full capability of data safety and remote communications and the meters fabricated accordingly have been made commercially available for city gas metrology since 2007. This type of the MEMS gas meters for city gas metrology has provided direct measurement of the gas flow in the flow pipelines and solved the critical issues for the gas metrology with huge dynamic measurement ranges as well as battery powered electronics. The meter designed is of a direct flow pass through without any possibilities of clogging such that it has a better performance as compared to the rotary meters as particle clogging would shut off the gas supply with the rotary meters leading to detrimental results in industrial processing lines such as ceramic making. However, for many practical cases, in case of malfunctioning the electronic meters it often requires services at factory or service centers of the original manufacture instead of onsite part clean or replacement with sonic of the mechanical meters such as rotary meters or turbine. In addition, as the city gas meters are often tied up with the custody transfer metrology and tariff regulations, annual or biannual inspection/services are often mandatory, the return of the whole meter to the factory or the service centers would inigate customer complains of service disruption, bill dispute and/or other inconveniences, the problems now exist also with the current mechanical meter technologies. Further, it is also a costly procedure for both customers and manufacturers.

Therewith it is desired for this invention that the MEMS based electronic meter shall have the capability to provide continued metrology services while onsite repair or the regular services or maintenance is required. This continuation of services of the desired all-electronic gas meters shall also include the mandatory change or dismantlement of metrology units or any parts with the capability of maintaining the metrology integrate.

SUMMARY OF THE INVENTION

It is the objective of this invention to construct a new all electronic meter that shall have the capability of continued services at normal maintenance or when the meter is malfunctioning. In addition, the meter can from time to time self-check and provide information timely to the meter readers for the meter performance such that it shall bear all the features for the basic requirements for the city utility gas custody transfer or tariff while enhanced the information flow, non-interruptive performance, non-clogging without losing the metrology data during its service.

In one preferred embodiment, the invented meter shall have all capability of the all-electronic utility gas meters. It shall have the data safety via storage in multiple memory chips, the data transmission and data communication capability. It shall also have the low power capability that can be powered via battery for long and desired service or field battery life.

In another preferred embodiment, the invented all-electronic gas meter with exchangeable metrology unit for city gas custody transfer or tariff applications that utilizing MEMS mass flow sensors as the sensing elements. This meter shall have dual metrology units for enhancing reliability. One of the units shall be insertion type probe into the main flow pass that usually have the same diameter of the gas pipeline where the meter is to be installed. This probe has an integrated MEMS mass flow sensing assembly including the sensing element and the control electronics, while another unit shall have a bypass design and the bypass channel inlet and outlet are crossing the sensor probe assembly in the main flow channel. The bypass metrology unit is attached to the main flow metrology unit and shares the display and power source forming the invented complete all electronic utility gas meter. The main probe is placed as an insertion one into the center of the main flow channel that is made with a venturi structure for better flow stability. Further a pair of flow straightener and conditioner is placed at the inlet of the main flow channel for better metrology repeatability. The bypass unit is also incorporated with an integrated MEMS mass flow sensing assembly. The bypass unit shall further have an electronic control board with a memory chip that can be used to store the calibration data as well as other metrology data. This bypass unit therefore can be independently performing the metrology task providing that the meter body has the same construction particularly with the identical flow conditioning construction and configuration such that the bypass flow can be recovered identically when it is replaced by its duplicated ones. The MEMS mass flow sensing assembly in the invented independent bypass metrology unit is place in a bypass flow channel with Venturi configuration for a better stability and a smooth connection to the main flow channel and to the meter head with the main electronic control boards as well as the display and the battery power chamber. The whole package allows easy installation and possibility for mass production.

In another preferred embodiment, the major role of the invented bypass metrology unit is to have the independent onsite exchangeability if any maintenance or service or meter repair is required. The capability of the onsite exchangeability of the bypass metrology unit is ensured by calibration with the complete meter assembly of the identical design. Further, the bypass metrology unit can perform the metrology functionality independent of the main metrology unit, and it will serve as the backup when the main metrology unit is out of service or malfunctioning. In the case of routine service or maintenance, a new and pre-calibrated bypass unit can be installed onsite without dismantle of the complete meter assembly from the service pipeline, as it is normally the case for current technology that the complete meter, mechanical or electronic, is required to be shipped back to manufacture or service center or the third party metrology authority for re-certification or re-calibration. The new bypass metrology unit can then perform the said functionality of the re-certification or recalibration of the meter serviced onsite.

In another preferred embodiment, the invented complete meter assembly shall have the self-diagnostic functionality for its metrology performance at a desired time period or anytime when such a desired task is remotely requested via the network or handheld devices. At the pre-programed time period, the electronics of the invented meter assembly shall start to perform the said self-diagnostic routine that will execute the comparison of the stored metrology data in both the main metrology unit and the bypass metrology unit. Data of the accumulated flow rate or totalized flow rate as well as the instant flow rate of the specific time shall be compared. If any differences are above the preset limit, an alarm shall be registered and an event shall be stored in separate memory in the meter control electronic unit, and an alarm code shall be displayed on the meter display. In case that the meter is connected to the network, the event or alarm message shall be automatically transmitted to the data or service center. And the data or service center can then send instant request to retrieve the data from the meter or the specific message from the meter.

In another preferred embodiment, both the main metrology probe unit and the bypass metrology unit shall have independent storage memories. Further, in each of the metrology unit, the independent storage memories shall be in plural numbers. The measured data can be stored into these memories via a user programmable interface that shall allow the user to change the intervals of data storage and the specific information of storage such as time, totalized flow rate, instant flow rate and gas temperature. These data can be retrieved onsite or be transmitted to the data or service center at a time interval determined by the user. The stored data shall further be able to be retrieved by the onboard micro control unit (MCU) and such data shall be examined and compared at the interval also pre-determined by the user via the user interface. In case of any discrepancy, an event or alarm shall be registered at a different memory that can be retrieved onsite or be transmitted to the data or service center should the meter is connected to the network.

In yet another preferred embodiment, both of the main metrology probe unit and the bypass metrology unit shall be powered by lithium battery. The battery is preferred to be 9 amperage-hours to 38 amperage-hours that shall maintain as continued service life of 1.5 to 6 years for the meter. A power detector shall be incorporated on the control board inside the meter such that an end-of-life indicator or register shall be displayed or transmitted if the meter is connected to the network or remote metering system. The two metrology units shall share the power supply in case for the battery powered meter. And in case that the meter is connected with the network or remote metering system, it is preferred that the two metrology units are powered separately with the external power while the battery shall only service as the backup power source in case of external power shortage, In yet another preferred embodiment, the MUC inside the meter shall be from time to time to compare the measurement data from the two independent metrology units, and further determine whether there is any clogging taking place in the bypass metrology unit. Should such a symptom is determined, an event or alarm shall be recorded or registered and in case that the meter is connected to the network, such event or register shall be transmitted to the data or service center.

For the city gas custody transfer or tariff applications, this invention provides a solution for onsite service and exchange of the metrology unit without removal of the whole meters from the pipe that that prior art has been targeted. Each of the metrology unit with the said bypass configuration can be independently calibrated and provides easy access to the onsite services. This would require minimal interruption of the service during the maintenance. The said invention shall have better performance in compensating the environmental variations such as temperature and pressure and in particular self-diagnosis capability during field service. Further, the said invention provides data safety, capability of remote data transmission and easy installation, maintenance and overall cost reduction in meter build.

BRIEF DESCRIPTIONS OF THE DRAWINGS

FIG. 1. The invented all-electronic utility gas meter assembled with the two metrology units using MEMS mass flow sensors.

Figure 2:
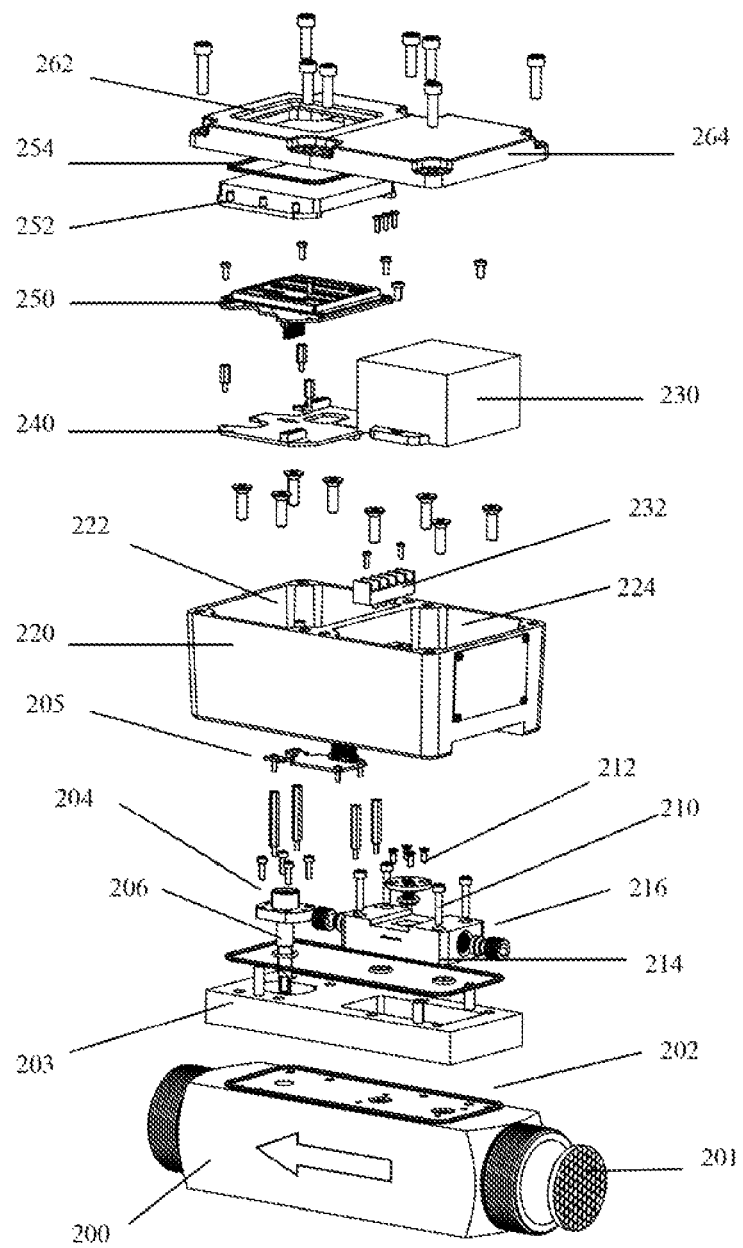

FIG. 2. The explosive view of the invented all-electronic utility gas meter with two independent metrology units using MEMS mass flow sensors and powered by battery.

Figure 3:
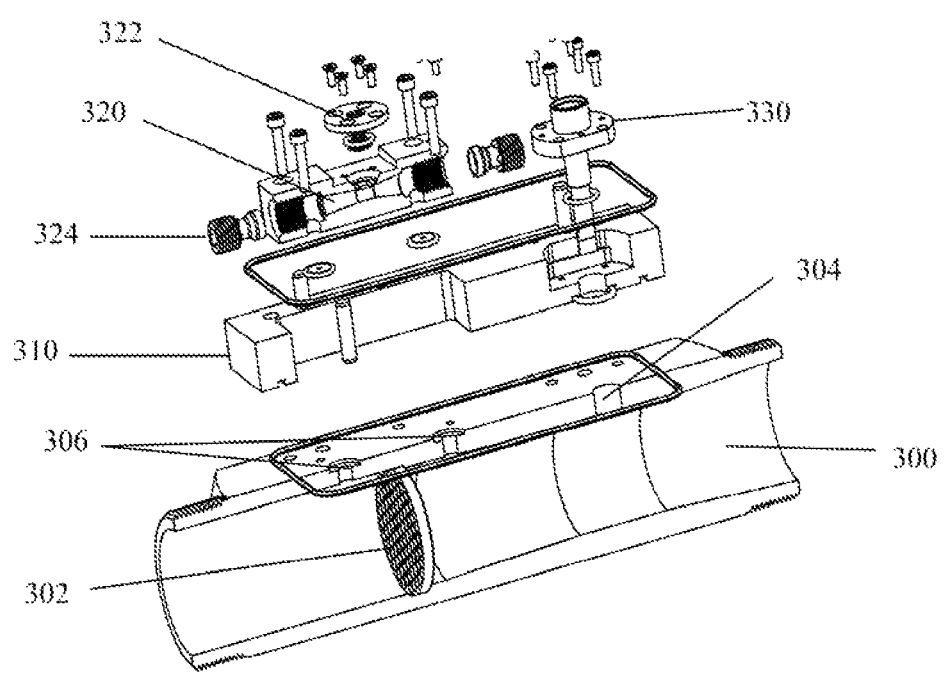

FIG. 3. The explosive view of the invented main metrology sensing unit and the independent bypass metrology unit that can be exchangeable onsite during maintenance, services or repair.

DETAILED DESCRIPTION OF THE PREFERRED EMBODIMENTS

The fully assembled all-electronic utility gas meter with exchangeable metrology unit disclosed in this invention is shown in FIG. 1. The preferred utility gas meter is constituent of the meter body with the main flow channel (100) on which the arrow (102) labeled preferred by laser mark or mechanical engraver indicates the flow direction such that the installation shall bear with the inlet (103). The preferred utility gas meter has its main component meter head (104) that is constituent of the main metrology unit, the secondary bypass metrology unit and the control electronics as well as the LCD display (105), the battery chamber (106) and the meter nameplate that describes the meter specifications and application limits.

The preferred utility gas meter is powered by the battery usually in the make of lithium ions. The MEMS mass flow sensor assemblies with control electronics only requires a battery power in a few hundred microwatts such that a pair of high capacity lithium ion batteries, for example of 38 ampere hours, shall ensure a field service life time of the meter at normal operation mode for over 10 years. This operation is comparable to that of the current mechanical utility meter. In case of the external communication is required or remote networking with the meter can be established, the meter can also utilize the external power supply while the internal battery supply will be served as the backup once the external power failure takes place the power supply shall be automatically switch to the internal power supply.

The detailed construction of the invented all-electronic utility gas meter with the exchangeable metrology unit is illustrated by the explosive view of the preferred meter in FIG. 2. In order to ensure the metering of the gas flow is stable, the inlet of the preferred meter body (200) is incorporated with a flow conditioning assembly (201) that consist of a flow straightener and a flow profiler. The metal connection block (203) is used to connect the metrology units to the meter body, and wherein the sealing between two components is provided with a corrosion proof rubber gasket (202). The main metrology unit (204) includes a MEMS sensor chip and a MEMS sensor chip housing to form an insertion probe that is placed into the flows channel inside the meter body. The signal conditioning circuitry of the main metrology unit (205) is connected to the MEMS sensor chip and placed on the top of the MESM sensor chip housing. The sealing between the main metrology unit and the meter body is provided by the corrosion proof rubber gasket (206). The detailed structure of the preferred secondary bypass metrology unit body (210) and its parts will be described thereafter. The secondary MEMS sensor chip assembly (212) is placed to the bypass flow channel and sealed with corrosion proof rubber gasket. This bypass metrology unit is placed inside the connection block with the inlet and outlet and the sealing between the secondary bypass metrology unit and the meter body is provided by a pair of corrosion proof rubber gasket (214) to the inlet and the outlet of the unit. The sealing (216) on the bypass metrology unit shall be described thereafter. This bypass metrology unit can be separated from the meter body without touching the main metrology unit, and further since the secondary bypass metrology unit contains the MEMS sensor chip as well as the flow channel it can be independently calibrated without the requirement of the attachment to the meter body as it is the case for the main metrology unit during the calibration. Therein this metrology unit with the bypass flow channel can be exchanged onsite during maintenance or service or repair without the need to dismantle the meter body from the service pipe line.

The meter head box (220) contains two separate chambers: the meter electronics chamber (222) houses the control electronics of the meter while the battery chamber (224) provides the space for the battery pack (230) that powers the meter. The battery pack is connected to the meter electronics via the battery connector (232) and sealed with rubber gasket and covered with the battery pack cover (264). This preferred design enables the intactness of the electronics of the meter when change of the battery is required. Further when the meter is inspected at any metrology facility for custody transfer or tariff purpose, the seal of the metrology unit after metrology inspection shall ensure the authentication in field from meter tamper or other metrology interruption during battery changes.

The main control electronics (240) shall contain the central process unit (CPU) and other necessary electronics such as analog to digital converter (ADC), amplifiers, power regulator, user interface as well as resistors and capacitors and other necessary components. The electronics shall also have memory chips that can independently store the metrology data for both the main metrology unit and the secondary bypass metrology unit. The data storage period can be programmable at the time of manufacture or during the maintenance or service or repair. The preferred independent memory chips shall be at least three for each metrology units to provide data safety as well as preventing data loss from electronic component failures. During the operation, the totalized flow rate, instant flow rate, time, battery status and any other desirable or undesirable events shall be registered and stored. And the data from each memory chip shall be retrieved and compared from time to time that can be programmed at the time of manufacture or during the onsite maintenance or service or repair. Should the data discrepancy between or among the memory chips is identified during the operation, an alarm or alarms shall be registered and displayed on the meter or be transmitted to the data center or service center in case the meter is connected to the network. The electronics also provides the interface for onsite meter reading and data download or remote networking. The preferred design shall be that when remote networking or onsite meter reading and data download is elected, the external power shall be used to preserve the battery power such that the field service life time of the meter can be ensured.

The liquid crystal display (LCD) and display required electronics (250) is also placed in the main control electronics chamber. It provides the direct meter interface and it is preferred that the totalized flow rate, instant flow rate, gas medium temperature, battery status as well as any meter operation code including any malfunctioning and data status shall be displayed. The preferred design requires the LCD can perform at a wide temperature range and in particular at a temperature as low as negative forty degree Celsius to ensure the proper meter performance in winter season. The LCD is covered with a glass cover (252) that is preferred to be treated with as transparent metal film at both surfaces such that outside electrical magnetic interference can be prevented. The glass is further sealed with a water proof sealing gasket (254) and covered with the display cover (263).

The detailed construction of the secondary bypass metrology unit and the connection to the meter body is illustrated in FIG. 3. The inside structure of the meter body is a flow channel with a venturi structure for better flow stability and a flow conditioning unit (302). The flow channel size shall match to that of the service pipe line. The meter body has three openings (304 and 306) that provide the access by the main metrology insertion probe unit (330) and the secondary exchangeable bypass metrology unit. The connection block (310) provides the housing for both the main metrology insertion probe unit and the secondary bypass metrology unit. The flow channel of the bypass metrology unit is also preferred to be venturi type (320) such that the flow stability during measurement can be enhanced. The MEMS sensor chip house (322) is place to the venturi channel such that the sensor surface is aligned with the venturi throat channel wall forming a boundary plate in the flow. This structure shall ensure a laminar flow condition across the MEMS sensor chip and help the metrology performance during the exchange of the unit. The sealing (324) of the bypass flow channel is preferred in the formality of screw having an inner flat surface against the channel for easier manufacture.

The invention claimed is:

1. An all-electronic utility gas meter with dual metrology units one of which can be exchangeable with MEMS mass flow sensing principle for city gas metering comprising:
   a meter body that has a flow channel connectable to the service pipe line;
   a main metrology unit as an insertion probe placed in the flow channel of the meter body;
   a secondary independent bypass metrology unit with a separate bypass channel connected to the flow channel of the meter body;
   a connection block which houses both the main metrology unit and the secondary independent bypass metrology unit;
   a meter head box that has two separate chambers to house the control electronics and the battery pack;
   a control electronic unit that has the capability to process, store and compare the data from the two metrology units;
   a battery pack that provides the power to the all-electronic utility gas meter and serves as a backup power in case of external power failure;
   a display unit which displays metrology data and meter operational status;
   a display glass cover that can withstand external electric magnetic interference; and
   a battery pack cover that is water proof;
   wherein said main metrology unit is formed as a probe which has a MEMS sensor chip placed at one end of a plate as the tip of the probe; and
   wherein surface direction of the MEMS sensor chip is in perpendicular to the gas flow direction.

2. The all-electronic utility gas meter of claim 1 wherein said meter body has a venturi flow channel with a flow conditioning assembly that contains a flow straightener and a flow profiler; wherein the flow channel has three passages on top of the channel providing access by the metrology units.

3. The all-electronic utility gas meter of claim 1 wherein said main metrology unit shall have the MEMS chip sensing element placed at center of the flow channel inside the meter body.

4. The all-electronic utility gas meter of claim 1 wherein said secondary independent bypass metrology unit is independently calibrated; and wherein the secondary independent bypass metrology unit can simultaneously measure flow with the main metrology unit using same metrology.

5. The all-electronic utility gas meter of claim 1 wherein said secondary independent bypass metrology unit can be exchanged onsite during maintenance, service or repairing without requirement of dismantling the meter body from service pipe line.

6. The all-electronic utility gas meter of claim 1 wherein said secondary independent bypass metrology unit has a venturi structure flow channel, and a second MEMS sensor chip is placed along the venturi structure flow channel sidewall; wherein the MEMS sensor chip is placed at throat (narrowest) location of the venturi structure flow channel.

7. The all-electronic utility gas meter of claim 6 wherein said MEMS sensor chip in the secondary bypass metrology unit is aligned along the sidewall of the venturi structure flow channel to cause a flow boundary condition for a laminar flow across the surface of the MEMS sensor chip.

8. The all-electronic utility gas meter of claim 1 wherein said connection block provides a housing for both the main metrology unit and the secondary bypass metrology unit; and wherein the connection block also serves as a positioning reference for the secondary bypass metrology during onsite exchange.

9. The all-electronic utility gas meter of claim 1 wherein said meter head box have two separate chambers that houses the main control electronics and the batter pack, respectively; and wherein the two separate chambers provide independent access for metrology assessment and power supply.

10. The all-electronic utility gas meter of claim 1 wherein said control electronics unit provides functionalities to process, store and compare metrology data from the two independent metrology units; wherein the metrology data is stored in three independent memory chips for each metrology unit to ensure data security and prevent data loss due to memory chip failure; wherein if a comparison of the metrology data from these independent memories chips identifies discrepancy, then an event or alarm register shall be performed; and wherein the control electronics also perform power status monitor and evaluation to send alarm register three months in advance before the depletion of battery power.

11. The all-electronic utility gas meter of claim 1 wherein said control electronics unit together with the MEMS sensor chips operates in a microwatt power such that battery power can provide 6 to 10 years of field operation time.

12. The all-electronic utility gas meter of claim 1 wherein said control electronics unit provides an interface apparatus for wired or wireless transmission such as blue tooth, Zigbee, infrared transmission and/or general packet radio service (GPRS) communication protocols.

13. The all-electronic utility gas meter of claim 1 wherein said battery pack comprises of lithium ion batteries with a capacity between nineteen ampere hours and thirty-eight ampere hours; and wherein the battery pack can provide power to the meter at a standalone operation mode to serve as a backup power.

14. The all-electronic utility gas meter of claim 1 wherein said display unit is a liquid crystal display (LCD) which can operate at a environmental temperature as low as to negative forty Celsius; and wherein the display can not only show data of accumulated and instant flow rate but the status of the meter operation that includes power status, gas temperature, event or alarm register, and error code.

15. The all-electronic utility gas meter of claim 1 wherein said display glass cover can withstand external interference by electrical magnetic field; and wherein the glass cover is coated with transparent metal films that meets requirements of electrical magnetic compatibility standards.

16. The all-electronic utility gas meter of claim 1 wherein a cover for the battery pack is water-proof such that the meter can be operated at an open space or environment.

\* \* \* \* \*